W. Hudgin,
Tapping Pipes.
Nº 19,852. Patented Apr. 6, 1858.
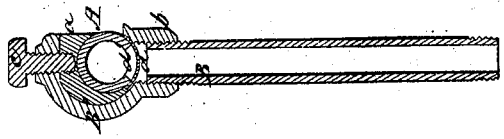
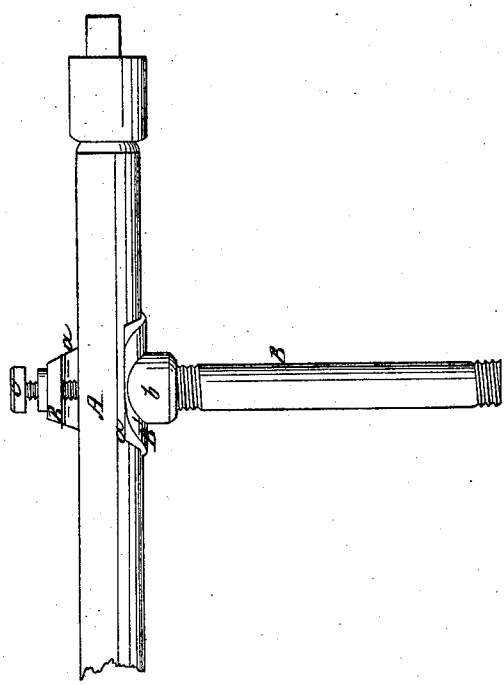

UNITED STATES PATENT OFFICE.

W. HUDGIN, OF WASHINGTON, DISTRICT OF COLUMBIA.

COUPLING PIPES.

Specification of Letters Patent No. 19,852, dated April 6, 1858.

*To all whom it may concern:*

Be it known that I, W. HUDGIN, of Washington, in the District of Columbia, have invented a new and useful Improvement in Coupling Branch Pipes to Main Pipes; and I do hereby declare that the following is a full, clear, and exact description of the same, reference being had to the accompanying drawings, forming a part of this specification, in which—

Figure 1, is a plan of a section of a main pipe with a branch pipe coupled to it after my invention. Fig. 2, is a sectional view of the same.

Similar letters of reference in the two figures indicate corresponding parts.

The object of my invention is to facilitate and lessen the expense and difficulty attending the attaching of branch gas pipes to the main pipes, and also to afford facilities for cutting off the supply through the branch pipes when desirable.

The nature of the same consists in effecting the combination of the main and branch pipes, by means of an open coupling which is furnished with an enlarged passage to receive the main pipe, a passage to receive or communicate with the branch pipe, and a set screw or wedge and key, and suitable packing, to make a tight joint and always maintain the same.

To enable others skilled in the art to make and use my invention, I will proceed to describe its construction and operation.

A, is a main gas or water pipe, and B, a branch pipe.

B′, is an open coupling consisting of a section of a tube with one portion of its circumference cut away as shown at $a$. The bore of this coupling is greater than that of the main gas tubes and a sufficient portion thereof is removed at $a$, so as to freely allow of the main pipe A, being introduced, through the side of the open coupling, into the bore of the same. This coupling also has a branch passage $b$, running at right angles to its bore. This branch is tapped so as to receive the threaded end of the branch pipe B, as shown. The coupling likewise is furnished with a set screw $c$, as shown, or a wedge and key, so that when suitable rubber or leather packing $d$ is interposed between the main pipe and the inner circumference of the coupling, the parts may be brought together and a perfectly tight joint formed.

The coupling constructed as above described, is capable of being set to the main pipe at any radial angle, the tapping or drilling of the hole $d′$, in the main pipe being accomplished very readily by simply filing across the pipe at right angles to the direction that the proposed connection is to be made, with a round file, and then cleaned out with a reamer or even with the end of the file to any desired size. This manner of making the hole is best for the smaller sizes of gas pipe, but the drill will answer better for large sizes.

The coupling is capable of being attached to any opening in the side of the pipe and the adjustment of the branch pipe to the main is in the usual way, and the whole cemented as ordinary gas fittings.

The advantages of this coupling over the ordinary mode of tapping service pipe are, 1st, the ease and simplicity with which the attachment is made; 2nd, the ease of cutting the hole in the service pipe, the file being capable of use in many positions where the working of a drill would be impossible, and 3rd, in making the attachment, no portion of the gas pipe designed to be tapped is removed or disturbed, and no joints necessarily broken.

The usual method of tapping service pipe, is to either drill the pipe and cut a female screw in the hole so formed, and insert the branch to be run or to cut the pipe in two and take out a portion, then form what gas fitters call a "running joint," involving a great deal of work, or a necessity of taking out all of the pipe from one of its ends or movable attachments up to the point where a branch is desired to be inserted.

What I claim as my invention and desire to secure by Letters Patent, is—

Effecting the combination of the main and branch pipes A, B, by means of an open coupling B′, which is furnished with an enlarged passage $a$, to receive the main pipe A, a passage to receive or communicate with the branch pipe B, and a set screw $c$, or wedge and key, and suitable packing to make a tight joint, and always maintain the same, substantially as and for the purposes set forth.

W. HUDGIN.

Witnesses:
G. YORKE AT LEE,
M. T. E. CHANDLER.